United States Patent [19]

McClung, III

[11] Patent Number: 5,799,616

[45] Date of Patent: *Sep. 1, 1998

[54] ANIMAL INTERACTION METHOD

[75] Inventor: Guy L. McClung, III, Spring, Tex.

[73] Assignee: Charlie Van Natter, Pasadena, Tex.

[*] Notice: The term of this patent shall not extend beyond the expiration date of Pat. No. 5,553,570.

[21] Appl. No.: 711,259

[22] Filed: Sep. 9, 1996

Related U.S. Application Data

[63] Continuation of Ser. No. 338,675, Nov. 14, 1994, Pat. No. 5,553,570.

[51] Int. Cl.⁶ .................................................. A01K 29/00
[52] U.S. Cl. ....................... 119/709; 119/51.01; 119/905; 446/5; 446/46; 273/424
[58] Field of Search ................................ 119/51.03, 707, 119/709, 710, 711, 905; 446/5, 46, 47, 48, 219; 273/317, 424

[56] References Cited

U.S. PATENT DOCUMENTS

| Re. 34,352 | 8/1993 | Markham et al. | 119/710 |
|---|---|---|---|
| D. 209,526 | 12/1967 | Dunbar | D34/15 |
| D. 343,262 | 1/1994 | Axelrod | D30/160 |
| D. 373,859 | 9/1996 | Markham | D30/160 |
| D. 374,515 | 10/1996 | Benson, II | D30/129 |
| D. 374,519 | 10/1996 | Ruble | D30/160 |
| D. 374,520 | 10/1996 | Plunk | D30/160 |
| D. 375,610 | 11/1996 | Loring | D1/112 |
| 1,006,182 | 10/1911 | Cousin | 119/711 |
| 1,022,112 | 4/1912 | Smith | 119/711 |
| 2,499,483 | 3/1950 | Foy | 446/219 |
| 2,988,045 | 6/1961 | Fisher . | |
| 3,123,047 | 3/1964 | Fisher . | |
| 3,359,678 | 12/1967 | Headrick . | |
| 3,441,001 | 4/1969 | Fisher . | |
| 3,871,334 | 3/1975 | Axelrod | 119/29.5 |
| 4,023,805 | 5/1977 | Sherill | 446/46 |
| 4,145,839 | 3/1979 | Sampietro | 446/47 |
| 4,207,702 | 6/1980 | Boatman et al. | 446/48 |
| 4,212,460 | 7/1980 | Kraft | 446/125 |
| 4,364,926 | 12/1982 | Yokogawa et al. | 424/50 |
| 4,513,014 | 4/1985 | Edwards | 426/132 |
| 4,557,219 | 12/1985 | Edwards | 119/29.5 |
| 4,563,160 | 1/1986 | Lee | 446/47 |
| 4,674,444 | 6/1987 | Axelrod | 119/29.5 |
| 4,712,510 | 12/1987 | Tae-Ho | 119/29 |
| 4,771,733 | 9/1988 | Axelrod | 119/29.5 |
| 4,802,444 | 2/1989 | Markham et al. | 119/29 |
| 4,876,819 | 10/1989 | Clifford | 43/26 |
| 4,919,083 | 4/1990 | Axelrod | 119/710 |
| 4,928,632 | 5/1990 | Gordon | 119/29.5 |
| 5,009,193 | 4/1991 | Gordon | 119/707 |
| 5,078,097 | 1/1992 | Chisholm | 119/51.13 |
| 5,139,945 | 8/1992 | Israel | 446/219 |
| 5,263,436 | 11/1993 | Axelrod | 119/710 |
| 5,277,641 | 1/1994 | Gable et al. | 446/48 |
| 5,329,881 | 7/1994 | O'Rourke | 119/710 |
| 5,339,771 | 8/1994 | Axelrod | 119/710 |
| 5,340,347 | 8/1994 | Yenerich | 446/48 |

(List continued on next page.)

FOREIGN PATENT DOCUMENTS

| 1/445/019 | 8/1976 | United Kingdom | 119/709 |
|---|---|---|---|

OTHER PUBLICATIONS

"R.C. Steele Wholesale Pet Equipment and Kennel Supplies," R.C. Steele Co., particularly pp. 3–5, pp. Holiday 4, pp. 53, 67–71 and back cover.

Primary Examiner—Todd E. Manahan
Attorney, Agent, or Firm—Guy McClung

[57] ABSTRACT

A method for a person to interact with an animal has been invented which includes a person throwing a plate on which at least one item is releasably mounted, retrieving the plate by the animal for the person, releasing of the at least one item from the plate by the person, and giving the at least one item to the animal.

19 Claims, 9 Drawing Sheets

U.S. PATENT DOCUMENTS

| | | | |
|---|---|---|---|
| 5,343,828 | 9/1994 | Houghton et al. | 119/709 |
| 5,358,440 | 10/1994 | Zheng | 446/48 |
| 5,390,629 | 2/1995 | Simone | 119/711 |
| 5,531,624 | 7/1996 | Dunipace | 446/46 |
| 5,536,195 | 7/1996 | Stamos | 446/48 |
| 5,540,610 | 7/1996 | Sneddon | 446/46 |
| 5,560,319 | 10/1996 | Rising | 119/709 |
| 5,560,320 | 10/1996 | Plunk | 119/709 |
| 5,575,240 | 11/1996 | Udelle et al. | 119/707 |
| 5,575,241 | 11/1996 | Line | 119/708 |
| 5,575,242 | 11/1996 | Davis et al. | 119/721 |
| 5,595,142 | 1/1997 | Chill | 119/710 |

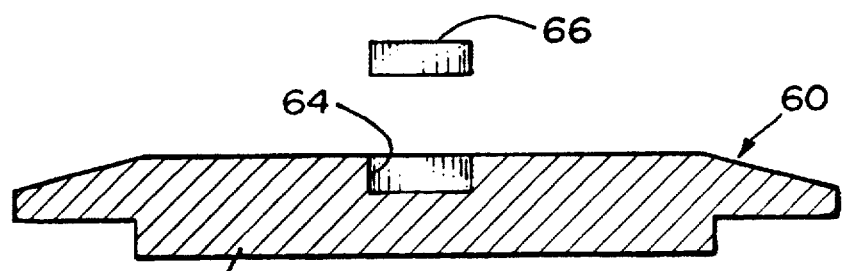
FIG. 4A
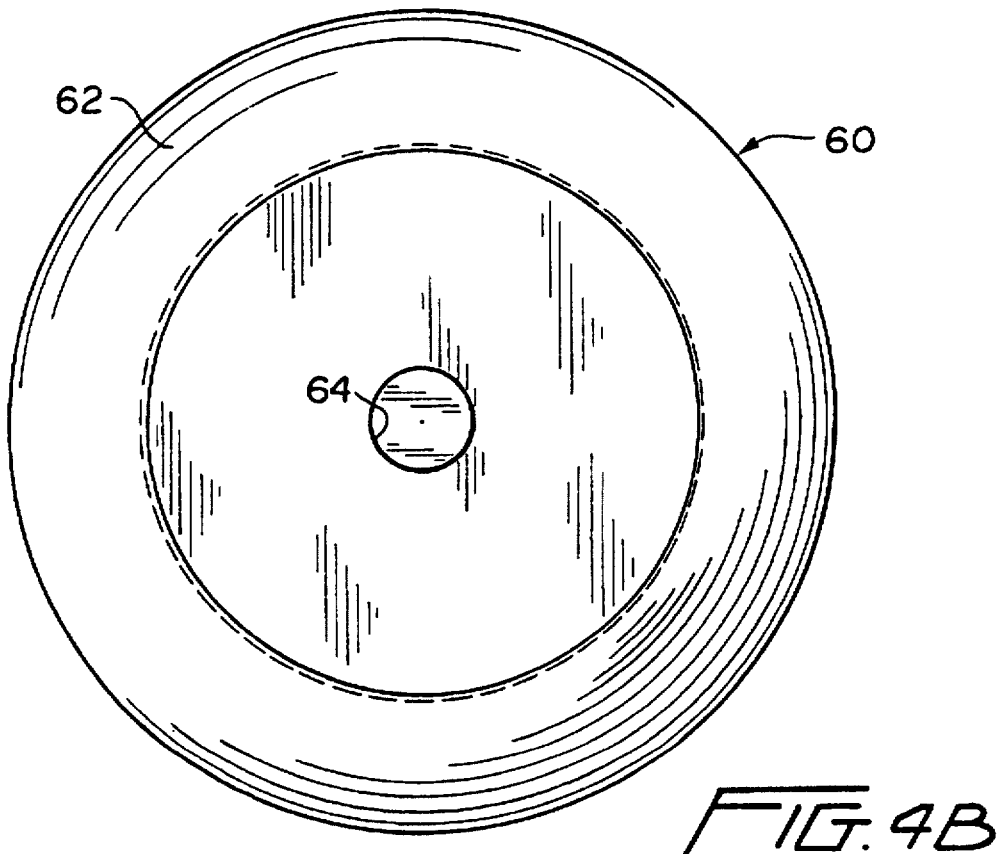
FIG. 4B
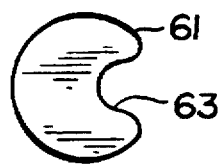 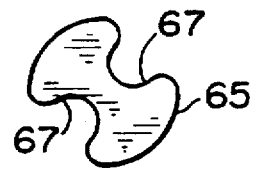 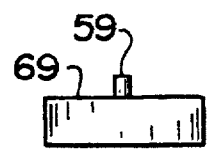
FIG. 4C    FIG. 4D    FIG. 4E

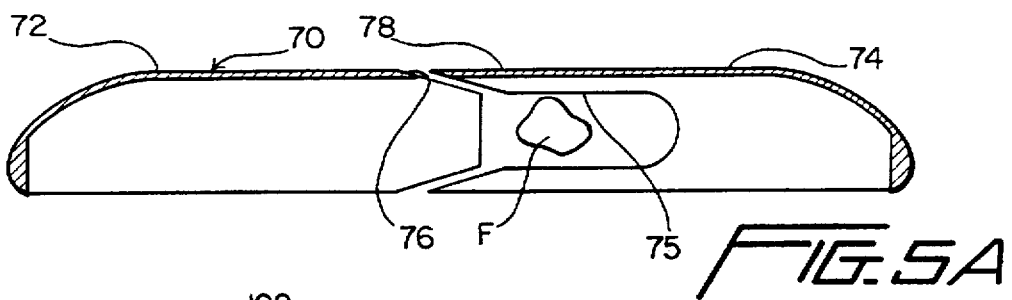
FIG. 5A
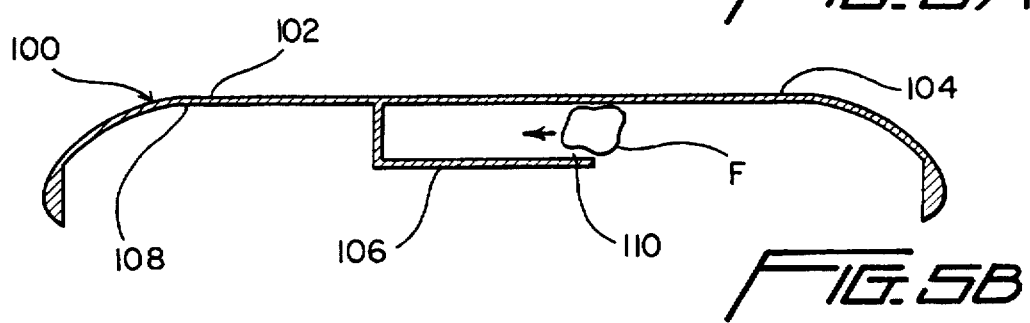
FIG. 5B
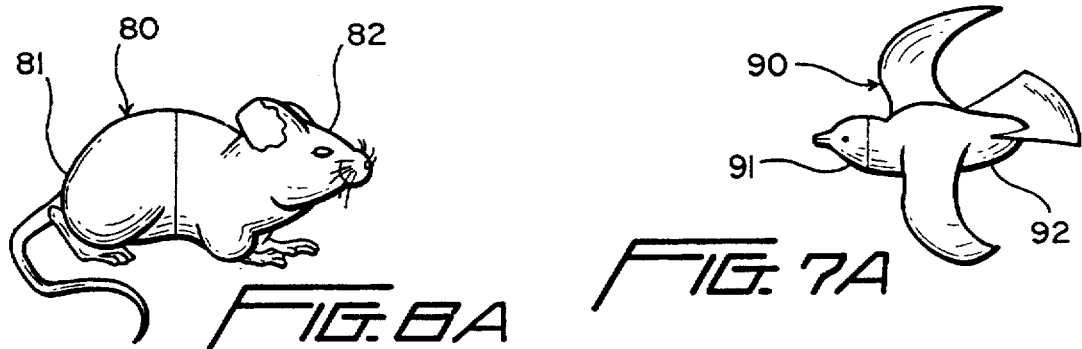
FIG. 8A
FIG. 7A
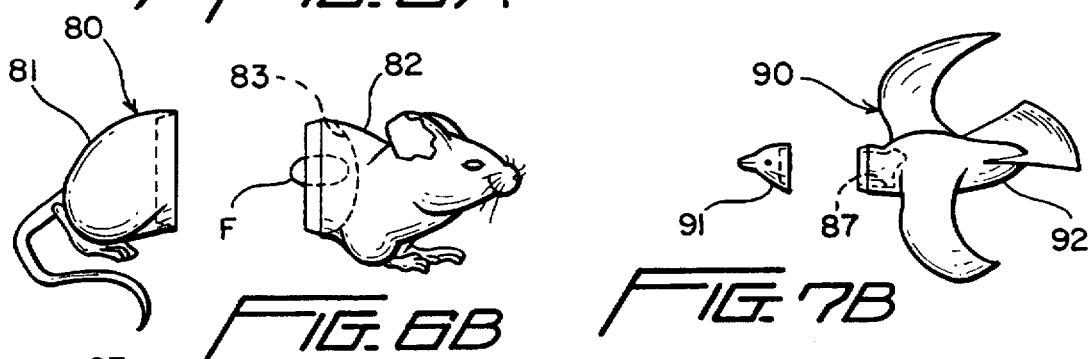
FIG. 6B
FIG. 7B
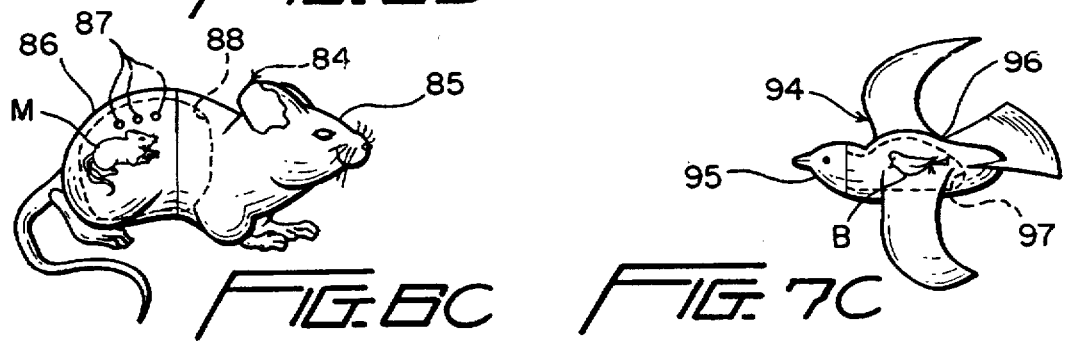
FIG. 8C
FIG. 7C

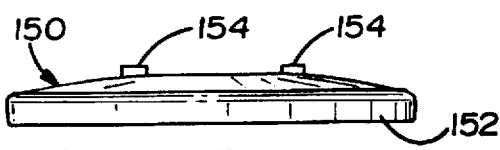
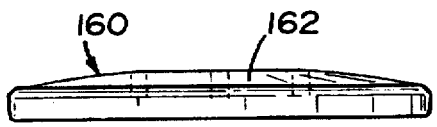
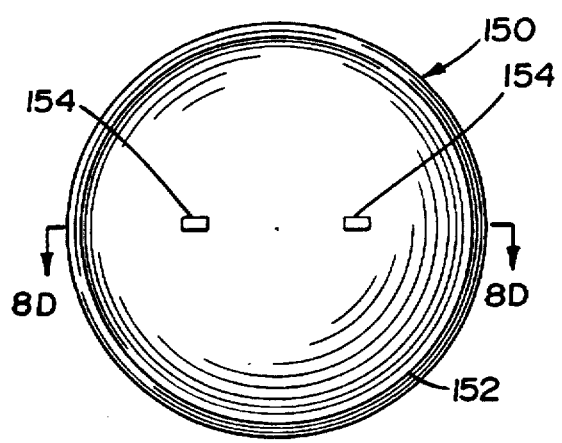
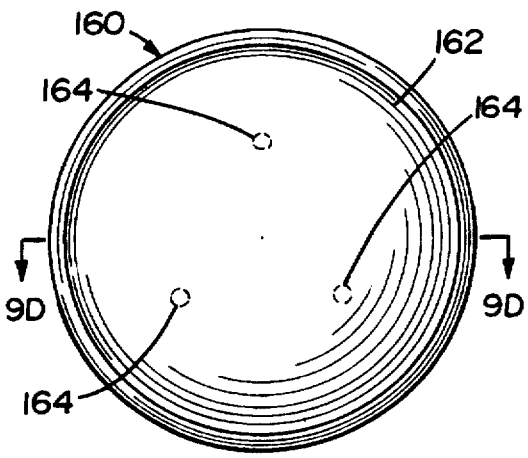
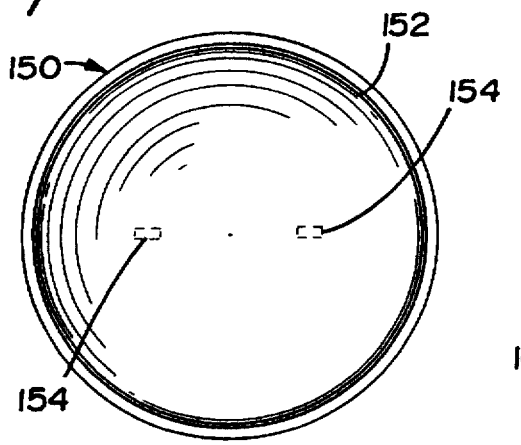
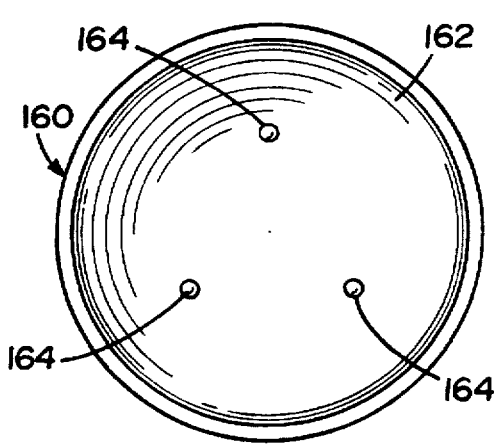
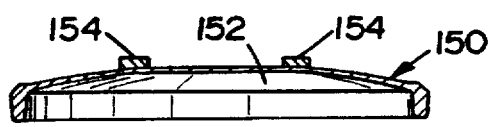
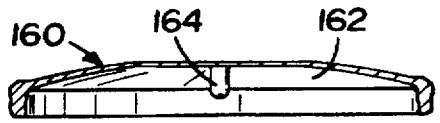

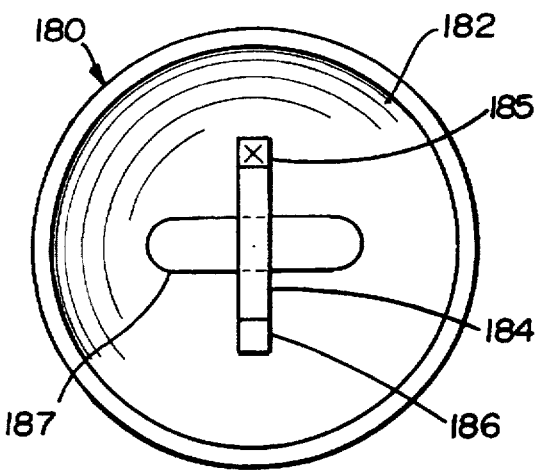
FIG.12A
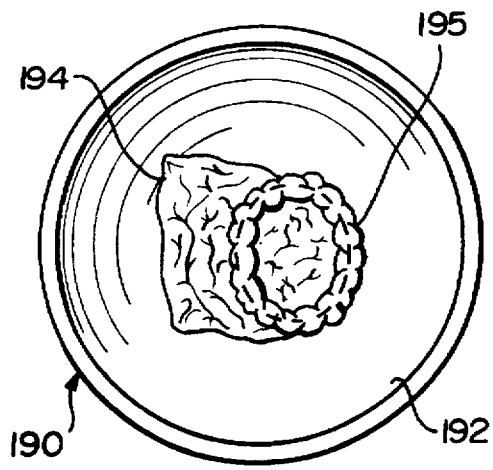
FIG.13A
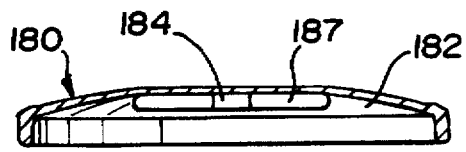
FIG.12B
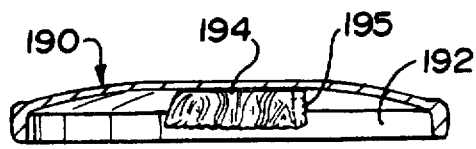
FIG.13B
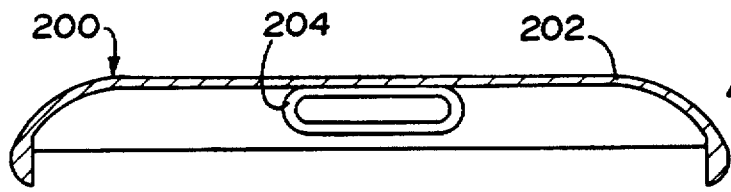
FIG.14
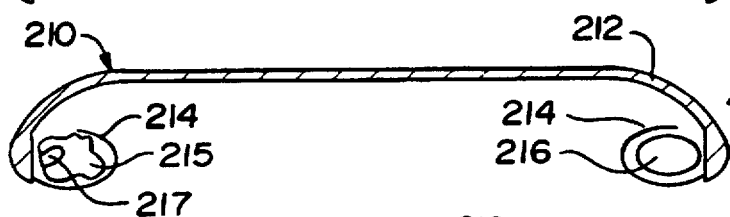
FIG.15
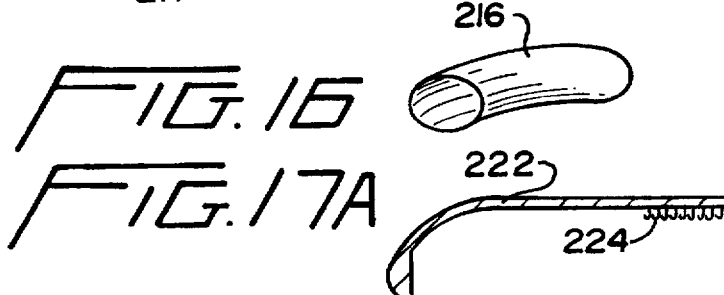
FIG.16
FIG.17A
FIG.17B
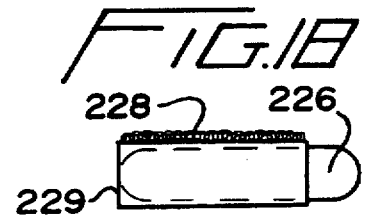
FIG.18
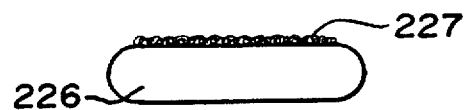

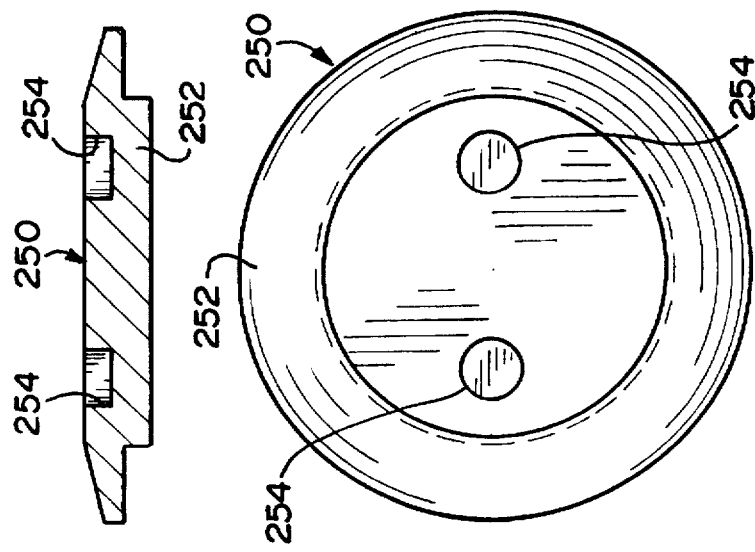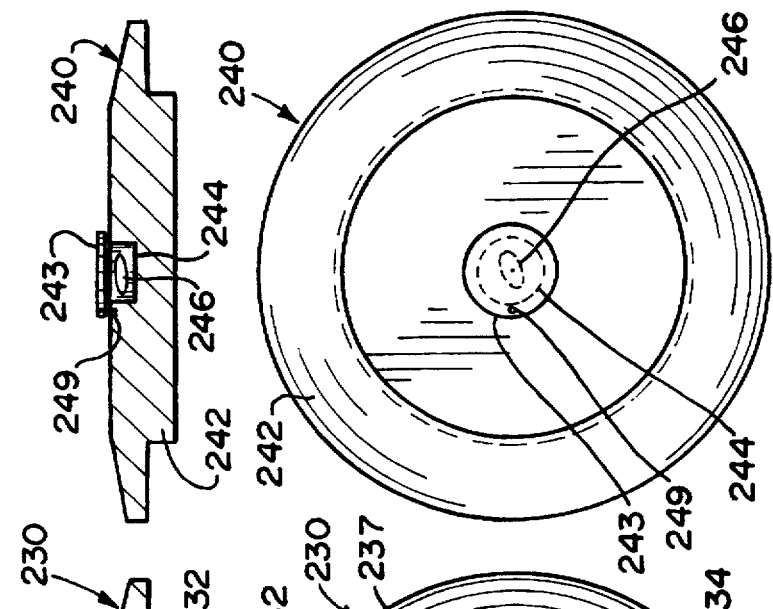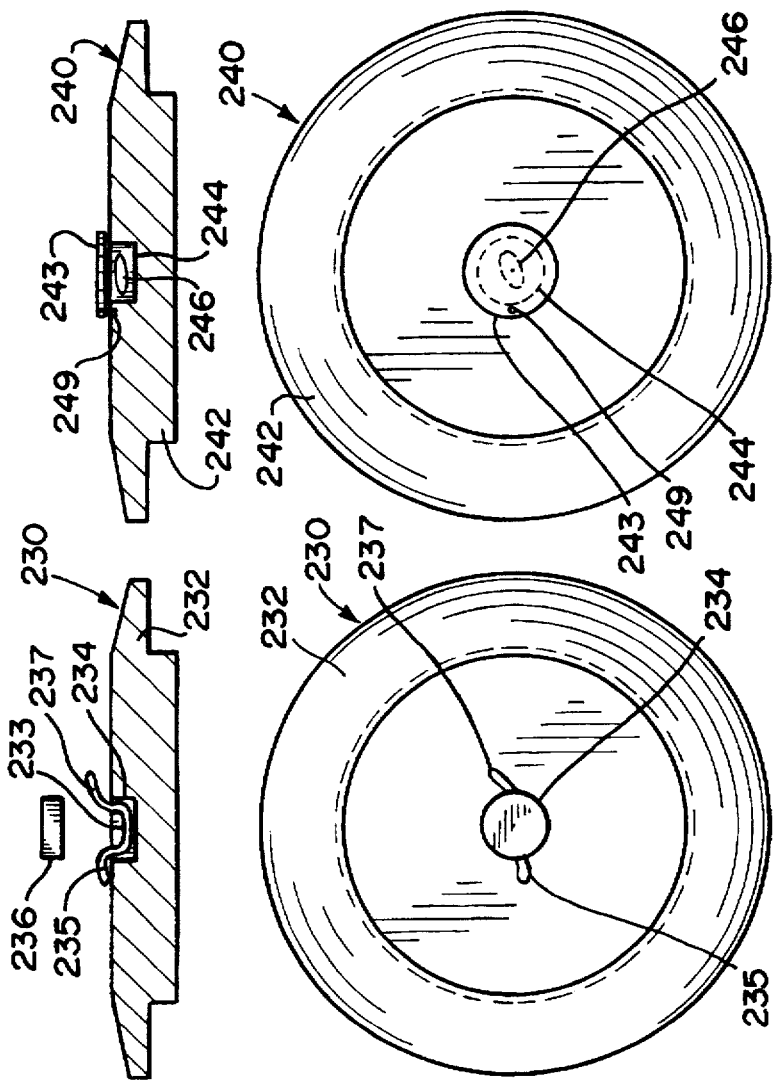

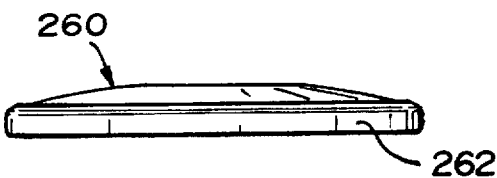
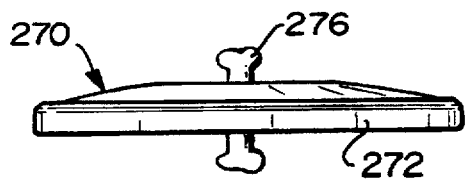
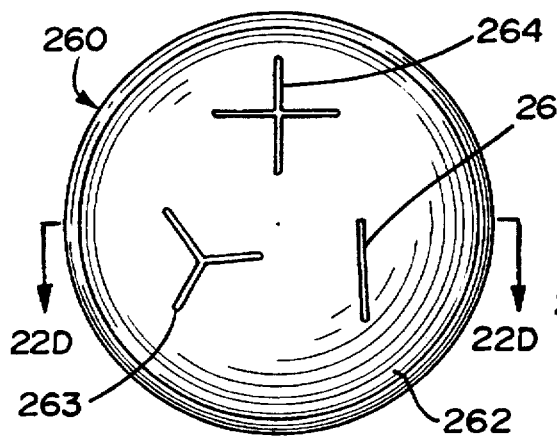
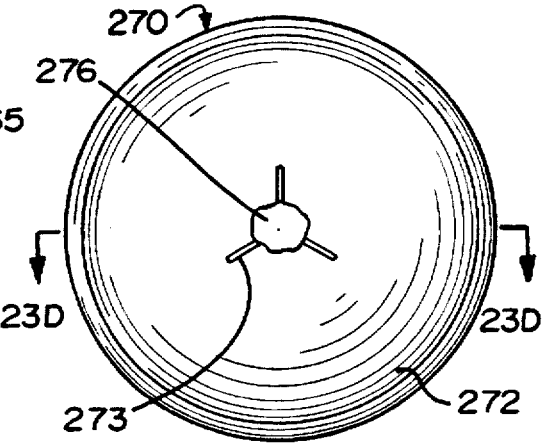
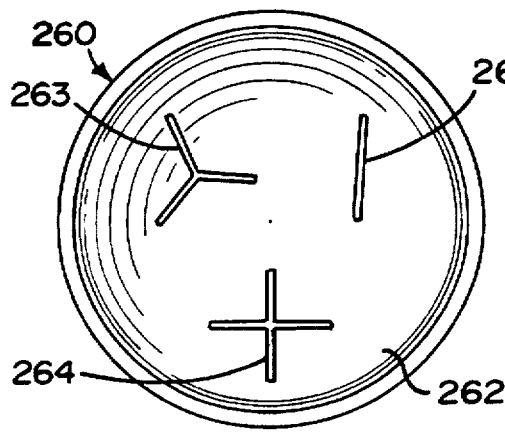
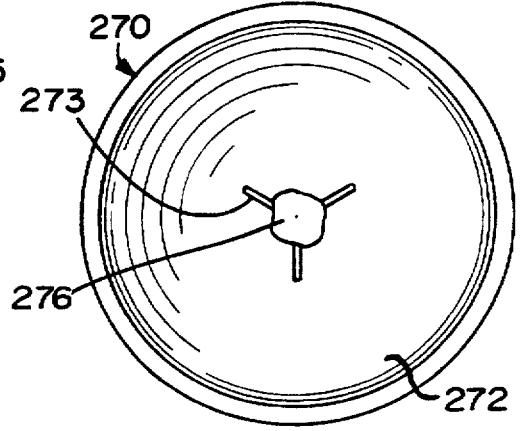
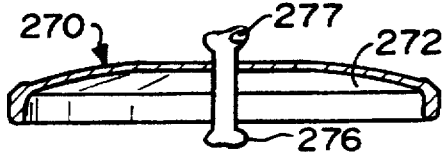

ANIMAL INTERACTION METHOD

RELATED APPLICATION

This is a continuation-in-part of pending U.S. application Ser. No. 08/338,675 entitled "Animal Retrieval Toy" filed on Nov. 14, 1994 and to be issued as U.S. Pat. No. 5,553,570 on Sep. 10, 1996.

BACKGROUND OF THE INVENTION

1. Field of the Invention

This invention is directed to methods for a person or persons to interact with other persons or with an animal and, in certain aspects, to animal toys and, in one aspect, to a toy on or in which a smaller toy or item, or treat or food substance is emplaceable.

2. Description of Related Art

The prior art reveals a variety of retrieval devices for playing with animals and for teaching them various behaviors, including such things as chewable toys, plastic bones, artificial animals, and Frisbee (TM) devices. U.S. Pat. No. 5,329,880 discloses a dog chew toy made from a length of rope impregnated with a therapeutic dental agent that is released onto a dog's teeth. U.S. Pat. No. 5,263,436 discloses a bone-shaped therapeutic device for dogs which is made from a hard, tough material with protruding spikes that scrape tartar and plaque from a dog's teeth as he chews the device. A design for such a device is disclosed in U.S. Pat. No. Des. 343,262. U.S. Pat. No. 4,802,444 (and U.S. Pat. No. Re. 34,352) discloses a therapeutic pet toy with an elastomer body with grooves sized for receiving a dog's teeth to scrape plaque and debris from the teeth. U.S. Pat. No. 4,712,510 discloses a stuffed pet toy at the end of a tether secured to a telescoping wand. U.S. Pat. Nos. 4,557,219 and 4,513,014 disclose a chewable animal toy made from super-tough molded elastomeric material with a surface-migrating flavoring material and a groove which facilitates flexing of the toy. U.S. Pat. No. 5,078,097 discloses an automatic food dispensing device for pets with a plurality of interior areas for holding and from which food is dispensed. U.S. Pat. No. 1,111,111 discloses an animal chewable toy with animal mean pieces disposed therein. U.S. Pat. Nos. 5,340,347; 3,359,678; and Des. 209,526 disclose flying toys which are generally saucer-shaped.

SUMMARY OF THE PRESENT INVENTION

The present invention teaches methods for interpersonal interaction and methods for persons to interact with animals. In one aspect a method according to this invention includes a person throwing a device to which is releasably secured, connected, or mounted an item; retrieval of the device by an animal (human, mammal, dog, etc.); and releasing the item from the device and giving it to the animal, in one aspect as a reward for correct and/or quick retrieval and return, and in another aspect as part of a game.

In one embodiment the present invention discloses a toy retrievable by an animal such as a dog or cat, the toy having a body with two joined yet releasable parts, one or both of which have a hollow portion therein or a holding device thereon for holding an item, animal treat, or food item and for preventing the animal from having access to the item until a person opens the body or releases the item from a holding device.

In one embodiment the body of the toy either has a portion of one part which is transparent or the entire part is transparent so that an animal can see a food treat, an item, or a picture within the body. Another embodiment according to the present invention includes a food item or items in a transparent wrapper or container which is held to or on the body. In one such embodiment an interior mirror is emplaced at a location in the toy so that it is viewable from the toy's exterior.

In one embodiment the two parts of the body have mating threads so the parts are screwable together. In another embodiment two parts are held together with a friction fit and/or a snap fit. In certain embodiments the body is shaped like a bone, or like a small animal that a larger animal would eat. In another embodiment the body is shaped as a flying toy plate or Frisbee (TM) device. In one aspect such a device is solid with an interior chamber or recess for holding an item, a treat, or food item.

In one embodiment the present invention discloses a series of devices as disclosed above of different colors and/or with different indicia (e.g. letters, symbols, or numbers thereon). In one method according to this invention for using such devices an item, a treat or food item is placed in only one of the devices and an animal (or person) is asked to retrieve that device according to its indicia from among a plurality of devices.

In another embodiment the body has a pocket or other container therein or thereon for holding a card or photograph.

Other embodiments include one, more, or any combination of all of the features listed above.

In another aspect a toy according to this invention has releasably secured thereto a container, envelope, or package with a food item therein, e.g. a piece of cheese, meat, dog food, cat food or candy; and in one aspect the container, envelope or package is transparent or has a transparent portion which reveals to an animal retrieving the toy or to a human being observing or using the toy the contents thereof. In one aspect a photograph or pictorial representation or other indicia is on a photograph or card emplaced in the container, envelope, or package. In one aspect a releasable adhesive material is used, either on the container etc., on a surface of the toy, or both, to hold the container etc. in place as the toy is used and/or thrown. In another aspect releasably cooperating material, e.g. Velcro (TM) material, is used to secure the container etc. to the toy.

It is, therefore, an object of at least certain preferred embodiments of the present invention to provide:

New, useful, unique, efficient, nonobvious animal interaction methods and animal toys which hold a treat, game piece, scoring indicator, food item or other item therein or thereon;

Such devices with a transparent portion or apparatus for revealing the food item or other item;

Such devices with two securable but separable parts; and

Such devices from which the item is easily releasable or removable;

Methods for using such devices for play and for education with animals or human beings.

The present invention discloses, in certain embodiments, a method for a person to interact with an animal, the method including a person throwing a plate on which at least one item is releasably mounted, retrieving the plate by the animal for the person, releasing of the at least one item from the plate by the person, and giving the at least one item to the animal; such a method wherein the animal is a mammal; such a method wherein the mammal is a dog; such a method wherein the at least one item is releasably mounted to the plate with a flexible member fixed to the plate and the method including stretching the flexible member and inserting the at least one item therein; such a method including releasably attaching the at least one item to the plate; such a method wherein the at least one item is releasably mounted to the plate by a projection on the plate releasably held in a slot on the at least one item, and the method includes emplacing the at least one item onto the projection; such a method wherein the at least one item is releasably insertable through and releasably holdable in at least one opening through the plate, and the method including inserting the at least item through the at least one opening; such a method wherein the at least one item is releasably held in at least one hollow container attached to the plate, and the method includes inserting the at least one item into the hollow container; such a method wherein the at least one item is removably held in at least one pocket fixed to the plate and the method includes inserting the at least one item into the pocket; such a method wherein the pocket is flexible and has a stretchable mouth through which the at least one item is passable into and out of the pocket; such a method wherein the plate has an upturned lip spaced apart from the body and the at least one item is releasably held between the lip and the body and the method includes inserting the at least one item between the lip and the body; such a method wherein the at least one item is releasably held in at least one recess in the plate and a flexible member with one end fixed to the plate is disposed with part thereof beneath the at least one item in the at least one recess with a free end of the flexible member extending out from the at least one recess, and the method includes pulling on the free end of the flexible member to facilitate removal of the at least one item from the at least one recess; such a method wherein the at least one item is from the group consisting of food, toys, game score indicators, food containers, beverage containers, hollow containers, and solid objects; such a method wherein hollow container has contents from the group consisting of food, beverage, toys, game score indicators, replicas of brand name products, and a secondary hollow container; such a method wherein the at least one item is releasably secured to the plate with releasably cooperating fastener material; such a method wherein the at least one item is a plurality of at least two items; such a method such a method wherein the plate has a shape as viewed from above from the group of shapes consisting of circular, square, rectangular, triangular, pentagonal, sexagonal, septagonal, octagonal, and nonagonal; such a method wherein the person is a first person, the plate is a first plate, the at least one item is a plurality of items, and the method includes throwing by the first person of the first plate and at least one second plate for contested retrieval by the second person and by at least one additional person, the at least one second plate comprising at least one throwing plate with at least one item releasably attached thereto; such a method wherein the plurality of items is a plurality of game pieces and the second person and the at least one additional person score in a game by retrieving a plate with game pieces releasably attached thereto; such a method wherein each game piece has scoring indicia thereon.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 4A is a side cross-sectional view of a flying retrieval toy according to the present invention. FIG. 4B is a top view of the toy of FIG. 4A. FIGS. 4C and 4D show a top view of a food treat or item according to the present invention. FIG. 4E shows a side view of a food treat or item according to the present invention.

FIG.5A is a side cross-sectional view of a flying retrieval toy according to the present invention, as is FIG. 5B.

FIG. 6A shows a perspective view of an artificial mouse toy according to the present invention. FIG. 6B shows an exploded view, partially in cross-section, of the mouse of FIG. 6A. FIG. 6C shows an artificial mouse toy according to the present invention.

FIG. 7A shows a perspective view of an artificial mouse toy according to the present invention. FIG. 7B shows an exploded view, partially in cross-section, of the mouse of FIG. 6A. FIG. 7C shows an artificial mouse toy according to the present invention.

FIG. 8A is a side view of a throwing plate according to the present invention. FIG. 8B is a top view of the plate of FIG.

8A. FIG. 8C is a bottom view of the plate of FIG. 8A. FIG. 8D is a crosssectional view along line 8D—8D of FIG. 8B.

FIG. 9A is a side view of a throwing plate according to the present invention. FIG. 9B is a top view of the plate of FIG. 9A. FIG. 9C is a bottom view of the plate of FIG. 9A. FIG. 9D is a crosssectional view along line 9D—9D of FIG. 9B.

FIG. 12A is a bottom view of a throwing plate according to the present invention. FIG. 12B is a crosssectional view along line 12B—12B of FIG. 12A. FIG. 13 A is a bottom view of a throwing plate according to the present invention. FIG. 13B is a crosssectional view along line 13B—13B of FIG. 13A.

FIG. 14 is a side view in crosssection of a throwing plate according to the present invention.

FIG. 15 is a side view in crosssection of a throwing plate according to the present invention.

FIG. 16 is a perspective view of a toy, food item, score indicator, or item according to the present invention.

FIG. 17A is a side crosssection view of a throwing plate according to the present invention. FIG. 17B is a side crosssectional view of an item according to the present invention. FIG. 18 is a side view in crosssection of an item according to the present invention.

FIG. 19A is a side view in crosssection of a throwing plate according to the present invention. FIG. 19B is top view of the plate of FIG. 19A.

FIG. 20A is a side view in crosssection of a throwing plate according to the present invention. FIG. 20B is a top view of the plate of FIG. 20A.

FIG. 21A is a side view in crosssection of a throwing plate according to the present invention. FIG. 21B is a top view of the plate of FIG. 21A.

FIG. 22A is a side view of a throwing plate according to the present invention. FIG. 22B is a top view of the plate of FIG. 22A. FIG. 22C is a bottom view of the plate of FIG. 22A. FIG. 22D is a crosssectional view along line 22D—22D of FIG. 22B.

FIG. 23A is a side view of a throwing plate according to the present invention. FIG. 23B is a top view of the plate of FIG. 23A. FIG. 23C is a bottom view of the plate of FIG. 23A. FIG. 23D is a crosssectional view along line 23D—23D of FIG. 23B.

DESCRIPTION OF EMBODIMENTS PREFERRED AT THE TIME OF FILING FOR THIS PATENT

Figure 1A:
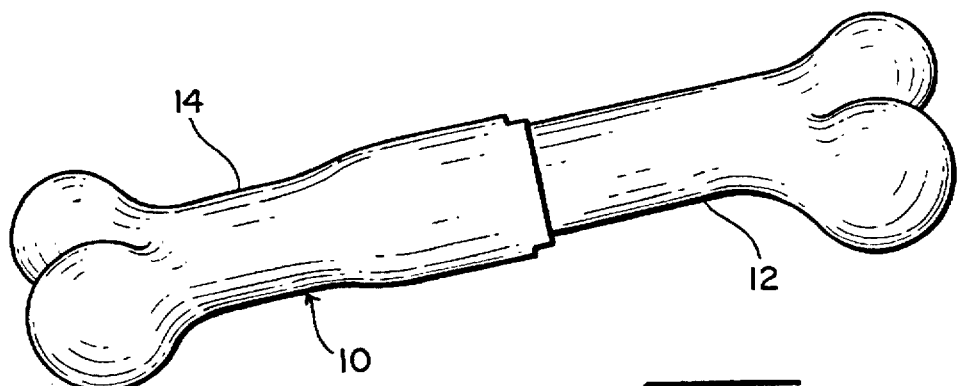
FIG. 1A is a perspective view of an artificial dog bone according to the present invention.
Figure 1B:
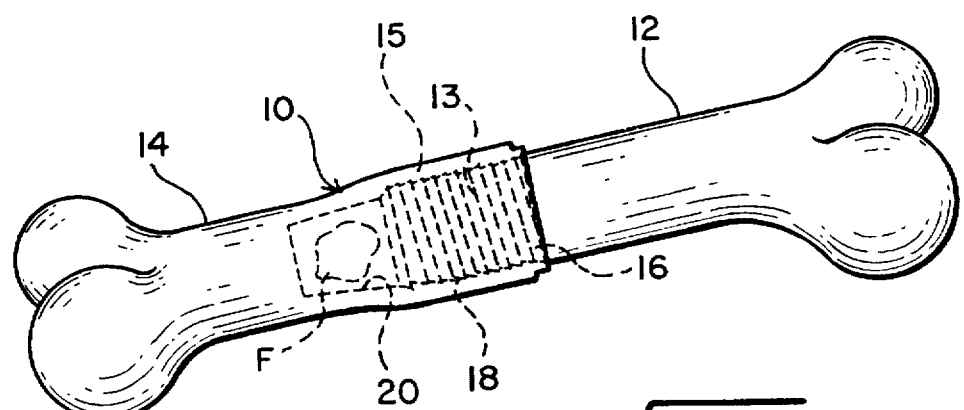
FIG. 1B is a cross-sectional view of the bone of FIG. 1A.

FIGS. 1A and 1B show a retrieval device 10 according to the present invention which is generally shaped like a bone. The device 10 has two releasably separable parts 12 and 14 which are releasably secured together with exterior threads 16 or an end 13 of the part 12 and interior threads 18 on an end 15 of the part 14. A treat or food item F is removably confined in an interior chamber 20 of the part 14. After an animal retrieves the device 10, a person unscrews the two parts 12 and 14 and either removes the item F and gives it to the animal as a reward or lets the item F roll out from the interior chamber 20.

Figure 1C:
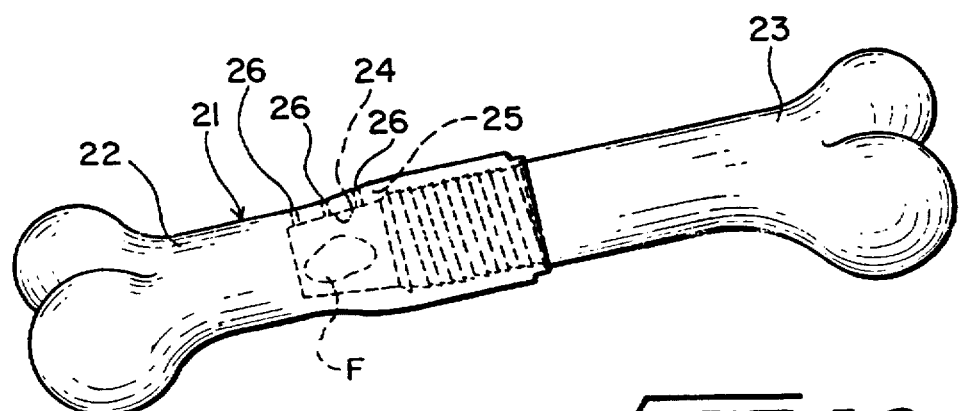
FIG. 1C is a cross-sectional view of another embodiment of a bone according to the present invention which is similar to the bone of FIG. 1A.

A device 21 according to the present invention is shown in FIG. iC which is similar to the device 10 of FIG. 1A. The same numerals in FIGS. 1A and 1C indicate the same structure. An end 22 of the device 21 is releasably securable to an end 23. A treat or food item F is disposed in an interior chamber 24 formed in the part 22. A transparent piece 25 over all or a portion of the chamber 24 permits visual access to the item F while it is in the chamber 24. Optionally one or more vent holes 26 serve as air holes and/or permit an aroma from the item F to escape from the chamber 20 to further interest an animal in retrieving the device 21 and/or to provide a sensory indicator of the location of the device 21, e.g. if it is hidden in tall grass or under water. A mirror M is viewable through the transparent piece 25. A transparent piece 25 may be used with any embodiment of the present invention disclosed or described herein.

Figure 2:
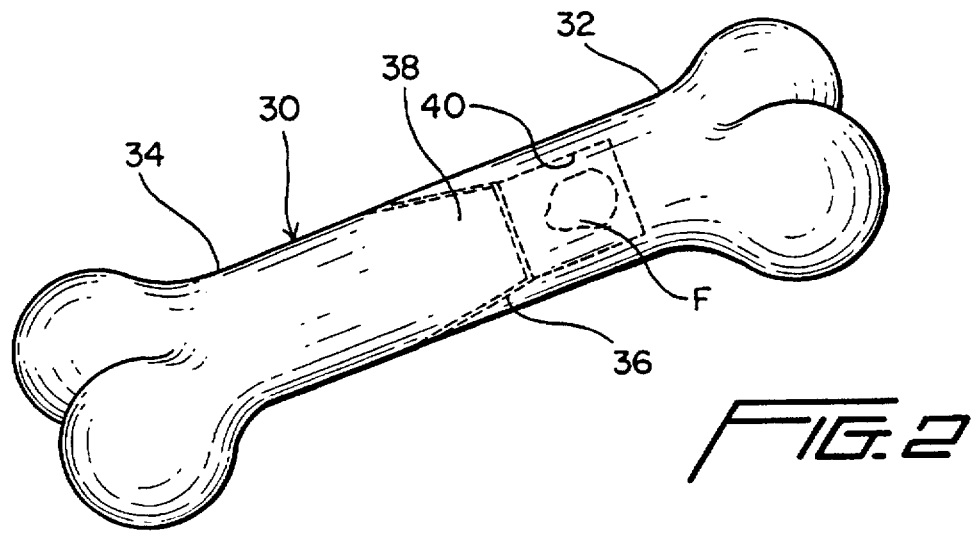
FIG. 2 is a perspective view of an artificial dog bone according to the present invention with interior aspects shown with dotted lines.

FIG. 2 illustrates a device 30 according to the present invention which has two parts 32 and 34 releasably secured together by a friction fit between an end 38 of the part 34 and an end 36 of the part 32. A treat, food item, or other item F is disposed in an interior chamber 40 of the part 32. Known snap-fit mechanisms (not shown) may be used with the two ends 36 and 38 for further securement of the two parts.

Figure 3A:
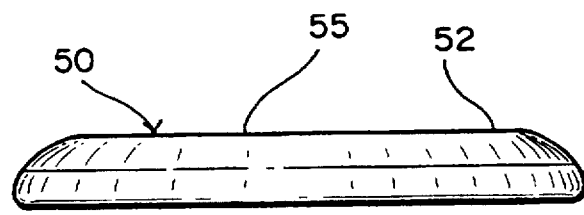
FIG. 3A is a side view of a flying retrieval toy according to the present invention.
Figure 3B:
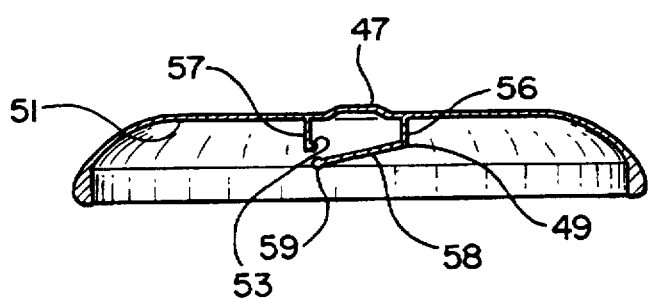
FIG. 3B is a side cross-sectional view of the toy of FIG. 3A.
Figure 3C:
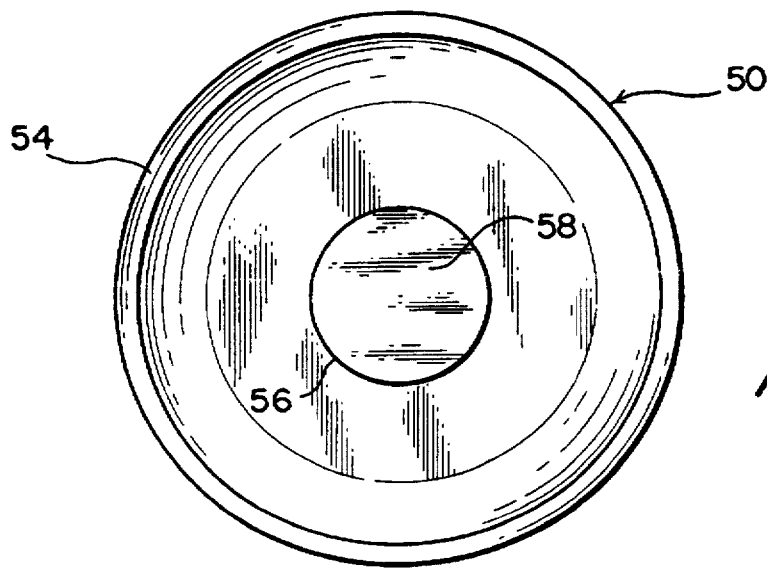
FIG. 3C is a bottom view of the toy of FIG. 3A.
Figure 10A:
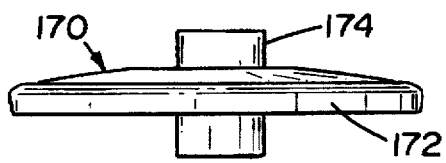
FIG. 10A is a side view of a throwing plate according to the present invention.
Figure 11A:
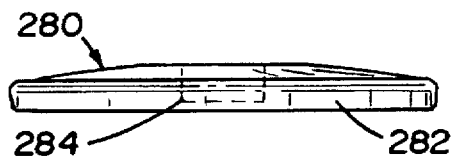
FIG. 11A is a side view of a throwing plate according to the present invention.
Figure 10B:
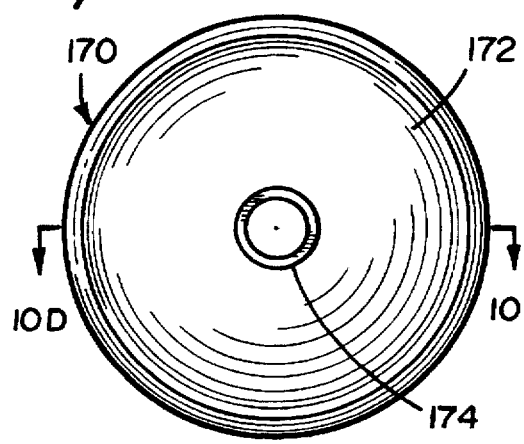
FIG. 10B is a top view of the plate of FIG. 10A.
Figure 11B:
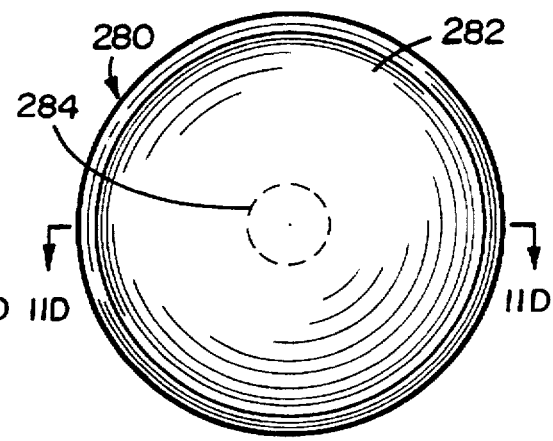
FIG. 11B is a top view of the plate of FIG. 11A.
Figure 10C:
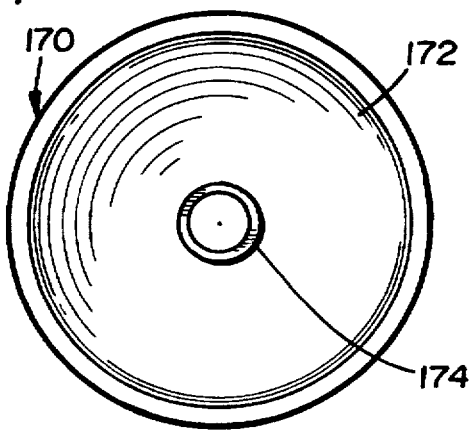
FIG. 10 C is a bottom view of the plate of FIG. 10A.
FIG. 10D is a crosssectional view along line 10D—10D of FIG. 10B.
Figure 11C:
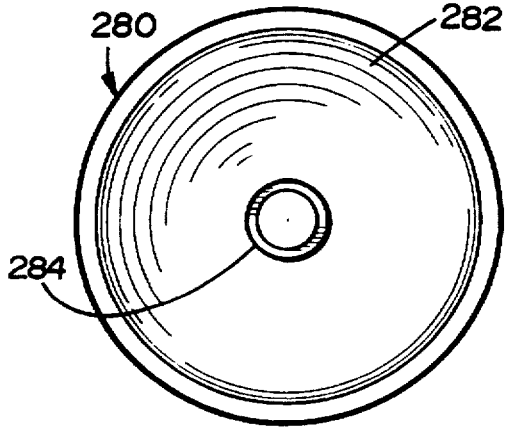
FIG. 11C is a bottom view of the plate of FIG. 11A.
Figure 10D:
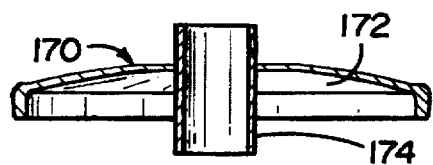
Figure 11D:
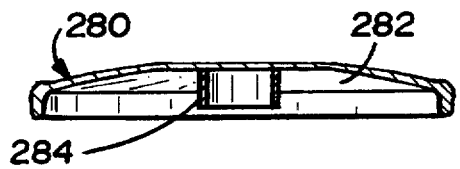
FIG. 11D is a crosssectional view along line 11D—11D of FIG. 11B.

FIGS. 3A–3C show a generally plate-shaped flying retrieval toy 50 according to the present invention which has a body 52 with a top surface 55 and a lateral edge 54. A container 56 is secured to or formed of a bottom surface 51 of the body 52. An item F is removably emplaceable in the container 56. The container 56 may be releasably secured to the bottom surface 51 with a suitable adhesive, mechanical structure (e.g. a clip), or releasably cooperating fastener (e.g. VELCRO (TM) material). The container 56 has a sidewall 57 and a hinged lid 58 connected, e.g. with a living hinge 49 to the side wall 57. The lid 58 may be releasably securable to the side wall 57 with a snap-fit structure that includes, e.g. a bead 59 on the lid 58 and a bead recess 53 on the side wall 57. Alternatively the lid 58 may be releasably received and held within the interior periphery of the side wall 57. A portion 47 of the body 52 may be transparent.; alternatively any device according to this invention may be made entirely of transparent material.

FIGS. 4A and 4B show a generally plate-shaped flying retrieval toy 60 according to the present invention that has a main body 62 with a recess 64 therein for receiving and holding a treat, food item, or other item 66. In one aspect, proper sizing of the recess 64 and item 66 results in a friction fit of the item 66 in the recess 64 rendering it difficult or impossible for an animal to remove the item 66 from the recess 64. Indentation(s), hole(s) or a raised portion on the item 66 will facilitate removal from the recess 64 by a person. A recess such as the recess 64 may be positioned anywhere in the body 62 and two or more such recesses may be used on the same or different sides of the body 62. FIG. 4C shows a food treat or item 61, like the item 66, but with an indentation 63 to facilitate handling and removal from a recess. FIG. 4D shows a food treat or item 65, like the treat 61, but with two indentations 67. FIG. 4E shows a food treat or item 69 with a raised portion 59 to facilitate handling and removal from a recess. Although the items 61, 65, and 69 are shows as generally cylindrical, they may be any shape or configuration usable with a recess of any suitable shape or configuration, e.g. but not limited to cone-shaped, cubic, etc.

FIGS. 5A and 5B show a flying retrieval toy 70 according to the present invention which has two parts 72 and 74 releasably held together by a friction fit of an end 76 of the part 72 held within an end 78 of the part 74 to form a generally plate-shaped plate member. An item F is held in an interior chamber 75 of the part 74.

For particular animals a retrieval toy according to the present invention may be made to look like another creature which a particular animal eats. For example, FIGS. 6A and 6B show an artificial mouse 80 according to the present invention which is attractive to cats which has two releasably securable parts 81 and 82 with an interior chamber 83 for holding an item F. FIG. 6C shows an artificial mouse 84 with two releasably secured parts 85 and 86. Part 86 has air holes 87. A smaller artificial mouse or live mouse S is disposed in an inner chamber 88 of the mouse 84. The mouse 84 is made of transparent plastic so the live mouse may be seen.

FIGS. 7A and 7B show an artificial bird 90 with two releasably securable parts 91 and 92 with an interior chamber 87 for holding a food treat or other item. FIG. 7C shows an artificial bird 84 with two releasably secured parts 85 and 86. Part 86 has air holes 87. A smaller artificial bird or live bird B is disposed in an inner chamber 88 of the bird 84. The bird 84 is made of transparent plastic so the live bird may be seen. It is within the scope of this invention to provide a body of any animal shape with a smaller artificial or live animal therein, or to insert therein any of the items or treats previously described herein. With respect to those embodiments shown from only one side in the drawings, the other side is a mirror image of the side shown.

FIGS. 8A–8D show a throwing plate 150 according to the present invention with a body 152 and two upstanding posts 154. The posts 154 are shaped, sized, disposed, and configured for releasable receipt within a recess, opening, or slot in a toy, food item, container, game piece, game scoring indicator, food container, beverage container, replica of a food or beverage container (e.g., but not limited to a can of beer or carbonated drink), or other container (hereinafter referred to collectively as an "item" or "items"). The item is thus releasably mountable to or securable on the plate. It is within the scope of this invention to have one, two, three, four, or more of the posts 154 spaced apart on the body in any manner, in any pattern and/or with any desired spacing on the top, side, and/or bottom thereof, and, in one aspect, spaced so that the plate is balanced. It is also within the scope of this invention for the plate (and for any plate disclosed herein) to be any desired shape as viewed from the top or from the bottom, including, but not limited to a shape that is square, oval, circular, rectangular, triangular, pentangular, sexangular, septangular, octangular, etc.

FIGS. 9A–9D show a throwing plate 160 according to the present invention with a body 162 and three downwardly projecting posts 164. The posts 164 are shaped, sized, disposed, and configured for releasable receipt within a recess, opening, or slot in a toy, food item, container, game piece, game scoring indicator, food container, beverage container, replica of a food or beverage container (e.g., but not limited to a can of beer or carbonated drink), or other container (hereinafter referred to collectively as an "item" or "items"). The item is thus releasably mountable to or securable on the plate. It is within the scope of this invention to have one, two, three, four, or more of the posts 164 spaced apart on the body in any manner, in any pattern and/or with any desired spacing on the top, side, and/or bottom thereof, and, in one aspect, spaced so that the plate is balanced.

FIGS. 10A–10D show a throwing plate 170 according to the present invention with a body 172 with a hollow holder 174 extending therethrough. The hollow holder 174 releasably holds an item or items and is formed integrally of the body 172 or is secured to it, e.g. by suitable adhesives or tape. As shown, the hollow holder 174 is cylindrical, but it is within the scope of this invention for it to be any shape (as viewed from above or from below), including the shapes mentioned for the plate 150 and a shape corresponding to the shape of an item releasably held therein. Two, three, four or more of the holders 174 may be used with the plate 170 and they may be disposed on the top, bottom, and/or side thereof.

FIGS. 10A–10D show a throwing plate 280 according to the present invention with a body 282 with a hollow holder 284 extending therethrough. The hollow holder 284 releasably holds an item or items and is formed integrally of the body 282 or is secured to it, e.g. by suitable adhesives. As shown, the hollow holder 284 is cylindrical, but it is within the scope of this invention for it to be any shape (as viewed from above or from below), including the shapes mentioned for the plate 150 and a shape corresponding to the shape of an item releasably held therein. Two, three, four or more of the holders 284 may be used with the plate 280 and they may be disposed on the top, bottom, and/or side thereof. A removable cover or cap may be used on the open (lower) end of the hollow holder 284, and either or both ends of the hollow holder 174 may have such a cap or cover.

FIGS. 12A and 12B show a throwing plate 180 with a body 182 whose top view (not shown) is like that of the plate 150 without the posts 154, but whose bottom view shows a strap 184 with and end 185 fixed to the body 182 and an end 186 releasably connectible (e.g., with an adhesive, with releasably cooperating fastener material (e.g. hook and pile material), or with VELCRO (TM) material) to the body 182. It is within the scope of this invention for the strap 184 to be anywhere on the body 182 (top, bottom, side, any location); for there to be one, two, three, four, or more such straps; and for there to be one or more straps on different parts of the body (e.g. but not limited to one or two straps on the top and one or two straps on the bottom).

FIGS. 13A and 13B show a throwing plate 190 with a body 192 whose top view (not shown) is like that of the plate 150 without the posts 154, but whose bottom view shows a cloth or fabric pocket 194 with an openable/closable mouth 195. The pocket is fixed to the body 192 with any suitable adhesive or fasteners. The mouth 195 may have an expandable/contractible band such as a band of elastic material–shown stretched open in FIG. 13A. The pocket 194 may be releasably connected to the body 192, e.g., with adhesive, fasteners, and/or releasably cooperating fastener material, or with VELCRO (TM) material) to the body 182. It is within the scope of this invention for the pocket 194 to be anywhere on the body 192 (top, bottom, side, any location); for there to be one, two, three, four, or more such straps; and for there to be one or more pockets on different parts of the body (e.g. but not limited to one or two pockets on the top and one or two pockets on the bottom). The pocket 194 removably holds an item or items.

FIG. 14 shows a throwing plate 200 according to the present invention with a body 202 to which is affixed a rubber band or flexible strip 204 for releasably holding an item or items. The band or strip 204 may be attached as the pocket 194 or strip 184 is attached or it may me attached by placing it through a hole or opening in the plate, and, if needed tying a knot or knots in the band or strip. The band or strip 204 may be releasably connected to the body 202, e.g., with adhesive, fasteners, and/or releasably cooperating fastener material, or with VELCRO (TM) material) to the body 202. It is within the scope of this invention for the band or strip 204 to be anywhere on the body 202 (top, bottom, side, any location); for there to be one, two, three, four, or more such band/or strips; and for there to be one or more bands or strips on different parts of the body (e.g. but not limited to one or two bands or strips on the top and one or two bands or strips on the bottom). The band or strip 204 removably holds an item or items.

FIG. 15 shows a throwing plate 210 according to the present invention with a body 212 having an upturned lip 214 formed, disposed, and configured to releasably hold an item 215 and/or an item 216. The lip may be turned outwardly rather than inwardly as shown in FIG. 15. As shown, the lip 214 is flexible so that the item(s) are removable from the plate 210 by freeing them by moving the lip. The item 215 has a slot 217 for use with the projections or posts of the plates of FIGS. 8A and 9A. A similar slot may be used in any item disclosed herein. The lip 214 may be more rigid than shown and not extend back toward the plate body as much so that an item or items may releasably be held between the lip and the interior wall of the plate body and the item released without moving the lip. A lip 214 may used on the top of the plate 210, on the bottom (as shown), or on both. A portion of such a lip may be used anywhere on the body to releasably hold an item or items.

FIG. 16 shows the item 216. The item 216 may have a length such that it covers only a portion of the circumference of the plate 210 (as shown), or it may be sufficiently long to cover the entire circumference of the plate 210.

FIG. 17A shows a throwing plate 220 according to the present invention with a body 222 and releasably cooperating fastener material 224 on the bottom thereof. An item 226 (FIG. 17B) has corresponding releasably cooperating fastener material 227 so that it is releasable connectible to the body 222. The item 226 may be any item disclosed herein. In one aspect the item 226 is a food item, e.g. but not limited to, a dog biscuit or dog treat made so that part of the item to be consumed by the dog or animal is in the form of pieces, fibers, or fibrils which releasably mate with the material 224. It is within the scope of this invention to use the material 224 anywhere on the plate 220 and to use one, two, three, four, or more such pieces of material.

FIG. 18 shows a hollow container 229 with releasably cooperating fastener material 228 with an item 223 removably disposed therein. The hollow container 229 is releasably attachable to the material 224 of the plate 220 of FIG. 17A.

FIGS. 19A and 19B show a throwing plate 230 according to the present invention (like that of FIG. 4A) with a body 232 with a recess 234 therein for releasably receiving and holding an item 236. A flexible member 233 has an end 235 fixed to the body 232 and is positioned so that it is emplaceable in the recess 234 under the item 236 with a free end 237 projecting from the recess. Pulling on the free end 237 facilitates removal of the item 236 from the recess 234.

The flexible member 233 may be any suitable cloth, string, wire, yarn, plastic, or rubber. Such a member 233 may be used with any recess for an item disclosed herein.

FIGS. 20A and 20B show a throwing plate 240 according to the present invention (like that of FIG. 4A) with a body 242 with a recess 244 therein for releasably receiving and holding an item 246. A movable cover 243 is pivotally pinned with a pin 249 to the body 242 permitting selective access to the item 246. Instead of a pinned cover, a soft or rigid cover may be adhesively and removably attached over the recess 244.

FIGS. 21A and 21B show a throwing plate 250 according to the present invention (like that of FIG. 4A) with a body 252 with a two recesses 254 therein for releasably receiving and holding an item (not shown). It is within the scope of this invention for their to be three, four, or more recesses 254 in the plate 250 or in any plate disclosed herein.

FIGS. 22A–22D show a throwing plate 260 with a body 262 according to the present invention. The body 262 is made of material sufficiently flexible and resilient so that an item may be inserted through and releasably held in slitted portions 263, 264 and 265. Any number of such slitted portions may be used positioned anywhere on the body 262, including in the top, bottom, and/or side thereof.

FIGS. 23A–23D show a throwing plate 270 with a body 272 according to the present invention. The body 272 is made of material sufficiently flexible and resilient so that an item 276 is inserted through and releasably held in a three-armed slitted portion 273. Any number of such slitted portions may be used positioned anywhere on the body 272, including in the top, bottom, and/or side thereof. The item 276 may have a slot 277 for use with the projections or posts of the plates of FIGS. 8A and 9A.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A method for a person to interact with an animal, the method comprising a person throwing a plate on which at least one item is releasably mounted, retrieving the plate by the animal for the person, releasing of the at least one item from the plate by the person, and giving the at least one item to the animal.

2. The method of claim 1 wherein the animal is a mammal.

3. The method of claim 2 wherein the mammal is a dog.

4. The method of claim 1 further comprising releasably attaching the at least one item to the plate.

5. The method of claim 1 wherein the at least one item is releasably held in at least one hollow container attached to the plate, and the method further comprising inserting the at least one item into the hollow container.

6. The method of claim 1 wherein the at least one item is removably held in at least one pocket fixed to the plate and the method further comprising inserting the at least one item into the pocket.

7. The method of claim 1 wherein hollow container has contents from the group consisting of food, beverage, toys, game score indicators, replicas of brand name products, and a secondary hollow container.

8. The method of claim 1 wherein the at least one item is a plurality of at least two items.

9. The method of claim 1 wherein the plate has a shape as viewed from above from the group of shapes consisting of circular, square, rectangular, triangular, pentagonal, sexagonal, septagonal, octagonal, and nonagonal.

10. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is releasably mounted to the plate with a flexible member fixed to the plate and the method further comprising stretching the flexible member and inserting the at least one item therein.

11. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is releasably mounted to the plate by a projection on the plate releasably held in a slot on the at least one item, and the method further comprising emplacing the at least one item onto the projection.

12. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is releasably insertable through and releasably holdable in at least one opening through the plate, and the method further comprising inserting the at least one item through the at least one opening.

13. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is removably held in at least one pocket fixed to the plate, wherein the pocket is flexible and has a stretchable mouth through which the at least one item is passable into and out of the pocket, and the method further comprising inserting the at least one item into the pocket.

14. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the plate has an upturned lip spaced apart from the body and the at least one item is releasably held between the lip and the body and the method further comprising inserting the at least one item between the lip and the body.

15. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is releasably held in at least one recess in the plate and a flexible member with one end fixed to the plate is disposed with part thereof beneath the at least one item in the at least one recess with a free end of the flexible member extending out from the at least one recess, and the method further comprising pulling on the free end of the flexible member to facilitate removal of the at least one item from the at least on recess.

16. A method for a person to interact with an animal, the method comprising a person throwing a plate on which at least one item is releasably mounted, retrieving the plate by the animal for the person, releasing of the at least one item from the plate by the person, giving the at least one item to the animal, and wherein the at least one item is releasably secured to the plate with releasably cooperating fastener material.

17. A method for a first person to interact with at least two additional persons, the method comprising a first person throwing a plate on which at least one item is releasably mounted, retrieving the plate by one of the at least two additional persons, wherein the plate is a first plate, the at least one item is a plurality of items, the at least two additional persons is a second person and at least one additional person, and the method further comprising throwing by the first person of the first plate and at least one second plate for contested retrieval by the second person and by the at least one additional person, and the at least one second plate comprising at least one throwing plate with at least one item releasably attached thereto.

18. The method of claim 17 wherein the plurality of items is a plurality of game pieces and the second person and the at least one additional person score in a game by retrieving a plate with game pieces releasably attached thereto.

19. The method of claim 18 wherein each game piece has scoring indicia thereon.

* * * * *